(12) United States Patent
Forster

(10) Patent No.: US 6,205,952 B1
(45) Date of Patent: Mar. 27, 2001

(54) METHOD AND APPARATUS FOR PROVIDING DOMESTIC ANIMALS WITH LIQUID FOOD

(76) Inventor: Martin Forster, Gerwigstr. 25, 78234 Engen (DE)

( * ) Notice: Subject to any disclaimer, the term of this patent is extended or adjusted under 35 U.S.C. 154(b) by 0 days.

(21) Appl. No.: 09/413,522

(22) Filed: Oct. 6, 1999

Related U.S. Application Data

(62) Division of application No. 08/889,536, filed on Jul. 8, 1997, now Pat. No. 6,016,769.

(30) Foreign Application Priority Data

Aug. 2, 1996 (DE) .......................................... 296 13 366 U
Apr. 2, 1997 (EP) .................................................. 97105481

(51) Int. Cl.[7] .................................................. A01K 9/00
(52) U.S. Cl. .................................................. 119/71; 119/72
(58) Field of Search .................. 119/71, 72, 72.5, 119/51.5

(56) References Cited

U.S. PATENT DOCUMENTS

| | | | |
|---|---|---|---|
| 3,830,203 | * | 8/1974 | Murphy ............................. 119/51.11 |
| 3,874,342 | * | 4/1975 | Kloss ..................................... 119/71 |
| 4,550,685 | * | 11/1985 | Forster .................................. 119/71 |
| 4,653,432 | * | 3/1987 | Smeds ................................... 119/71 |
| 4,788,940 | * | 12/1988 | Forster .................................. 119/71 |
| 4,803,955 | * | 2/1989 | Gonsalves ............................. 119/71 |
| 4,993,365 | * | 2/1991 | Weerstra ............................... 119/71 |
| 5,355,833 | * | 10/1994 | Legrain ............................. 119/51.02 |
| 5,551,374 | * | 9/1996 | Wells ................................... 119/71 |
| 6,016,769 | * | 1/2000 | Forster .................................. 119/71 |

FOREIGN PATENT DOCUMENTS

| | | | |
|---|---|---|---|
| 59384 A1 | * | 9/1982 | (EP) ..................................... 119/71 |
| 2155749 A1 | * | 10/1985 | (GB) ..................................... 119/71 |

* cited by examiner

Primary Examiner—Peter M. Poon
Assistant Examiner—James S. Bergin
(74) Attorney, Agent, or Firm—Bachman & LaPointe, P.C.

(57) ABSTRACT

A method of providing domestic animals with liquid food which passes from a storage tank, in particular a mixing tank of an automatic drinker via a suction line to a suckling point, the quantity of liquid food removed is to be determined ahead of the suckling point.

27 Claims, 6 Drawing Sheets

METHOD AND APPARATUS FOR PROVIDING DOMESTIC ANIMALS WITH LIQUID FOOD

This is a Division of application Ser. No. 08/889,536, filed Jul. 8, 1997, now U.S. Pat. No. 6,016,769.

The invention relates to a method for providing domestic animals with liquid food which passes from a storage tank, in particular a mixing tank of an automatic drinker via a suction line to a suckling point, and to an apparatus for this purpose.

In current methods of fattening calves, piglets, lambs or the like, automatic drinkers are usually used, in which, for example, a milk powder is mixed in water and is fed to a suckling point. The domestic animal can remove the liquid food at this suckling point, the addition of food taking place in a metered manner. Usually, however, there is a large number of domestic animals to be fed in one shed, which means that a large number of suckling points should also be arranged, so that there is a relatively fair allocation of the food. However, in the known automatic drinkers, the allocation only takes place by means of the mixture preparation of the liquid food. If, for example, half a liter of mixture is prepared, the maximum the corresponding calf can drink is the said half liter.

Nowadays, there are already automatic drinkers which provide food to more than one suckling point. Even with these automatic drinkers, only a specific quantity of the mixture of liquid food is prepared. If a calf suckles at one suckling point, the other suckling point is blocked, which means that a calf wishing to drink at that point cannot remove any food. This is undesirable.

Furthermore, it is known from the prior art that mixing tanks are also used as measuring tanks to determine the quantity consumed. In this case, a distinction is made between two different possible embodiments.

On the one hand, automatic drinkers are used, which have a plurality of mixing tanks serving at the same time as measuring tanks. On the other hand, automatic drinkers with a mixture preparation tank are known, in which the drink or the food is supplied by a gradient or by pumps into a plurality of individual measuring tanks. One suckling point is then assigned to each of these measuring tanks. The disadvantage of the latter is that automatic drinkers of this type and, in particular their open measuring devices are extremely difficult to clean since this is done manually. Furthermore, open measuring devices are not particularly suitable for reasons of hygiene, since food perishes more quickly. Moreover, automatic drinkers of this type are very cost-intensive to manufacture and service.

Volume controllers and volume measuring devices are known from the prior art, which measure and control the throughflow and flow rate of food. These are extremely expensive and of complicated design. Since the medium to be measured or the food is made up of different food components, such as, for example, water, milk powder, concentrates, etc., and components which swell, the compositions of which constantly change, the food has a wide variety of properties. Determining and specifying precise flow characteristics, for example during pumping and during measuring, has previously not been possible without such complex and expensive volume measuring devices.

The present invention is based on the object of providing an apparatus of the abovementioned type, in which the quantity of liquid food a domestic animal has consumed can be determined in a simple and precise manner. Furthermore, the abovementioned disadvantages are to be eliminated.

Furthermore, the suckling of food at the suckling point is to be facilitated if young calves have to be taught to suckle. Moreover, production costs, servicing and, in particular, cleaning costs are to be reduced.

This object is achieved in that the quantity of liquid food removed is determined ahead of the suckling point.

In calf husbandry nowadays, the domestic animals to be provided with food are generally fitted with an identification element, for example with a transponder. As soon as a particular domestic animal goes to a suckling point, it is identified. A volume measuring element can then be used to determine precisely which domestic animal has consumed which amount of liquid food during which time. It is thus possible to control the fattening process precisely. For example, it is also possible to control the state of health of a calf if is has not come to the suckling point for a prolonged period.

A volume measurement can be taken, on the one hand, by separate volume measuring elements which are commercially available. However, it is preferably carried out by a construction element which is already present in the device. This may be a valve, for example, preferably a solenoid valve. The volume measurement is taken by measuring the opening time of the valve.

If a feed pump is provided, this can also be used for the volume measurement. For example, this is done by measuring the running time of the pump or its revolutions.

In order to allow the quantity drunk to be recorded properly, however, various factors have to be taken into account. On the one hand, these are pressure fluctuations in the suction line. These can be compensated, for example, by means of a constant upstream pressure on the suction line or by pressure controllers. It is also possible to connect volume controllers into the suction line, which only allow a specific quantity through, regardless of any upstream pressure. The pressure has to be controlled, above all, if food is provided via one line to a large number of suckling points at which a plurality of calves can drink.

Furthermore, it is important to determine the suckling behavior of each animal individually. Calves show different drinking behavior, in particular they suck in to a different extent, so that the opening time alone is not a precise measure of the quantity drunk. There are also calves which take short and very long drafts, whereas others hardly draw at all, but take a very long time for one draft.

In order that each domestic animal consumes the specific and intended quantity of food, to specify the quantity actually drunk a factor is determined as correction factor which allows a statement to be made for the precise quantity drunk by each calf within a specific time. Each calf is thus assigned an individual factor in order to correct specific opening times of the volume measuring element accordingly so that a specific quantity drunk by the calf can be specified precisely. This factor is transmitted to a control unit which calculates the precise quantity of food fed to the calf.

This factor for correcting the quantity drunk is determined and constantly corrected automatically or again each time when the calf grows and changes its suckling or drinking behavior. The factor is mainly determined automatically when the calf is the only one drinking at the suckling point. To do so, the length of time a calf takes to drink a specific, predetermined quantity of food is determined precisely. The quantity difference, measured by the average consumption of food, per unit of time forms the factor for each calf individually. If one calf drinks more slowly than others, the suction valve is opened for a longer period while it is drinking, and food is thus supplied to the calf for a longer period. A factor is formed from the difference between the suckling speed of the individual animal and the suckling speed of the overall average of all the animals, from which factor supplements and deductions for the suckling speed of the individual animal are calculated.

The factor can also be corrected manually. To do so, it is only necessary for a specific quantity, for example a few liters or a ration, to be given to the calf to drink and for the time until the tank is empty to be determined.

The factor can otherwise be used as a relative or absolute value to specify the quantity of food.

Furthermore, automatic calibration of the measuring elements can also be carried out by means of known part-quantities. In the case of pumps, this can be done using a predetermined feed quantity, since the quantity the pump delivers at which revolutions is known. This feed quantity is independent of which calf is currently drinking, which means that the number of revolutions has to be adapted to the respective calf. In this case, due regard must be given to the fact that changes to the measuring unit during current operation and changes, for example, to the viscosity of the food also have to be compensated.

An apparatus for carrying out the method according to the invention provides as a minimum for a volume measuring element to be connected into the suction line. How this is designed has been described above.

Moreover, a pressure sensor may be connected upstream of the suckling point. It is preferably arranged just before the suckling point. The distance from the suckling point is dimensioned so that the sensor switches the supply of food off just before the suckling point by means of the liquid pressure. By sucking the teat, the liquid is raised and the pressure switch switches the delivery of food on again. The solenoid valves and pumps used are, if appropriate, operated by means of pressure or negative pressure sensors.

If a negative pressure sensor is chosen, it switches the supply of food on during drinking directly due to the negative pressure generated.

In another exemplary embodiment of the invention, a feed pump is to be connected in between the suckling point and the automatic drinker, as is described in DE-A 36 13 887. The purpose of this feed pump is to assist the drinking of particularly young animals. Together with the volume measuring element according to the invention, ideal targeted feeding of the domestic animals, in particular the young animals, takes place.

The volume measuring element may be arranged separately between the feed pump and the suckling point, but it is also possible for the volume measuring element to be assigned directly to the feed pump so that the quantity of the liquid food delivered can be deduced solely from the activity of the feed pump itself. The latter case is technically less complex.

Above all, it is then possible to provide liquid food to a plurality of suckling points at the same time by means of an automatic drinker. For example, several young animals can remove liquid food at the same time at one to about six suckling points without obstructing one another.

Despite the simultaneous feeding of several animals, the quantity removed per animal is recorded precisely, the respective values of the individual volume measuring elements being stored separately per suckling point, but in relation to a specific identified animal.

As described in DE-A 36 13 887, the feed pump is controlled by means of a negative pressure prevailing in the suction line to the suckling point. That is to say, as soon as, for example, a calf begins to suckle, the feed pump is switched on and assists the flow of liquid food. In the present exemplary embodiment, a further additional switch should preferably be connected into this line between the negative pressure sensor and the feed pump, which switch enables the feed pump to be switched on in such a way that a small quantity of food emerges from the teat. As a result, the young animal is even more encouraged to feed. This is also similar with a cow's udder when a calf rubs its nose against a teat, for example, since a small quantity of milk then often sprays out of the teat and encourages the calf to suckle.

In a further exemplary embodiment of the present invention, a feed pump is inserted between the mixing tank and the suckling point or teat. This feed pump is preferably started up from inside the shed by means of an actuating switch arranged near to the teat. As a result, the food is delivered from the mixing tank via the suction line to the suckling point and emerges there. The main purpose of this is to accustom young calves to suckling or drinking at such suckling points. The young calf receives the food immediately when it suckles at the suckling point. It learns very quickly to operate it itself.

When the young calf has then later become accustomed to the teat or the suckling point, it can suck the food out of the mixing tank by itself without the pump being actuated. This is ensured by the fact that the feed pump permits throughflow when it is stationary. In this case, this feed pump is to be designed in such a way that the food can flow through the feed pump with virtually no resistance.

By changing the static pressure by increasing or lowering the mixing tank in relation to the suckling point, flow of the food toward the suckling point can be influenced additionally as is described in detail later.

In the exemplary embodiment with the feed pump, pressure sensors and volume measuring elements can also be connected in between the suckling point and the feed pump, if this is required, in order to start the pump up, as is described in detail above.

A further advantage of an arrangement of this type is that the feed pump can be used to clean the lines, the feed pump itself and the suckling point, in which case the mixing tank is then filled with, for example, water or a cleaning agent. For this purpose, the feed pump can preferably also be controlled from the tank.

In a further exemplary embodiment of the present invention, the mixing tank is assigned a control unit which preferably controls a plurality of volume measuring devices connected to a mixing tank. Two volume measuring devices are connected to a main line by means of a distributor. The individual volume measuring devices are connected via feedlines to individual suckling points or teats.

In the case of a plurality of lines to suckling points, a pump may be connected into each line, but it is also possible to provide food to two or more suction lines by means of a pump. The pump is then followed by a branching valve which is switched over to one suction line or the other. This switchover of the two valves takes place alternately at brief intervals. This interruption has no effect on the drinking behavior of the calves. Since only one valve is open in each case, the overall cross section remains constant, which results in a constant pressure and a uniform supply of food.

In this case, a buffer, in particular a storage tank, should preferably be provided in one or both suction lines, so that a calf can still suck off the residual quantity delivered to it even after its line has been switched off. A sensor may also be assigned to the buffer to control the valves.

A buffer of this type essentially comprises a closed tank, the volume of which is variable. In this case, the tank may be provided, for example, with a diaphragm of elastic configuration. However, a piston may also be arranged so as to be displaceable in the tank instead of the diaphragm. The purpose of the buffer is to store a specific residual quantity of food. The buffer is filled with food. Subsequently, the feedline is shut off by its valve and can operate a further suckling point with a further buffer. During this time, the calf can suck off the quantity of liquid food stored in the buffer. When the tank is empty, the feedline to the buffer is opened by means of an appropriate switch, in response to a signal of the switch, and food can again flow into the buffer. This operation is repeated.

A feed pump may be dispensed with if the liquid food in the suction line to the suckling point is under static pressure. In this case, it should prove to be advisable to connect a valve upstream of the suckling point so that no liquid food emerges from the suckling point unintentionally. This valve is preferably controlled by a sensor which opens the valve the moment a domestic animal begins to suckle. For reasons of simplicity, this sensor may be, for example, a pressure sensor which determines the negative pressure occurring during suckling and thus opens the valve. Several possibilities are also conceivable for the valve.

The static pressure of the liquid food can be utilized not only in providing food to one suckling point, but also in supplying liquid food to a plurality of suckling points.

To determine the quantity of liquid food removed, a volume measuring element may be connected upstream or downstream of the valve.

Two possibilities are feasible for generating a static pressure for the liquid food in the suction line. One possibility is to set the entire automatic drinker at such a height level that it is arranged above the suckling point. The mixing tank in which the liquid food mixture is prepared is thus also located above the suckling point, so that there is a gradient between the mixing tank and the suckling point.

The second possibility envisages the arrangement of a storage tank between the mixing tank and the suckling point, the storage tank being suspended higher than the suckling point. This means that the food mixed first has to be transported by means of a pump from the mixing tank into the storage tank. After a corresponding valve has been opened, the food then flows from the storage tank under static pressure to the suckling point.

However, it would also be conceivable for the food mixed to be transported by means of a pump through a ring line, to which a plurality of suckling points are attached, constantly or when required, circulating from a tank through the said ring line and back to the tank again. This would also ensure that a static pressure which facilitates the suckling of the animal is built up in the said ring line through the use of the pump.

Consequently, food can be provided to a plurality of suckling points at the same time by means of only one mixing tank and simple components, such as solenoid valves, a quite specific, controllable quantity of food being fed to each individual calf or each suckling point.

In a further exemplary embodiment of the present invention, a distributor is connected downstream of a pump, in particular a centrifugal or spiral pump. The distributor may have any desired number of different feedlines which lead to a further bifurcation and/or to a switchover valve. One line of the bifurcation leads directly to the suckling point and the other line leads to a common return line which opens into the mixing tank.

Arranged directly at the bifurcation are two solenoid valves, one of the two solenoid valves leading into the common return line to the tank. The other solenoid valve is connected to the suckling point.

The advantage resulting here from this arrangement is that one of the two valves is always open in alternation. Food thus flows constantly in a circuit from the mixing tank to the pump through the distributor to the two solenoid valves and from there to the return line or, if a calf is drinking, directly to the suckling point. The same pressure per suckling point thus prevails at each individual suckling point, irrespective of the number of animals suckling. Furthermore, each suckling point is supplied with exactly the same quantity of food under constant pressure.

It is also important in the present invention that all the pumps used are started up before the solenoid valves are switched on. This takes place, for example, by means of the negative pressure sensors. This prevents any inaccuracies in determining and measuring quantities, since the performance of the pump is different during the switching-on operation.

Further advantages, features and details of the invention emerge from the following description of preferred exemplary embodiments and with reference to the drawings, in which FIG. 1 shows a diagrammatic illustration of an apparatus according to the invention for providing domestic animals with liquid food;

Figure 1:
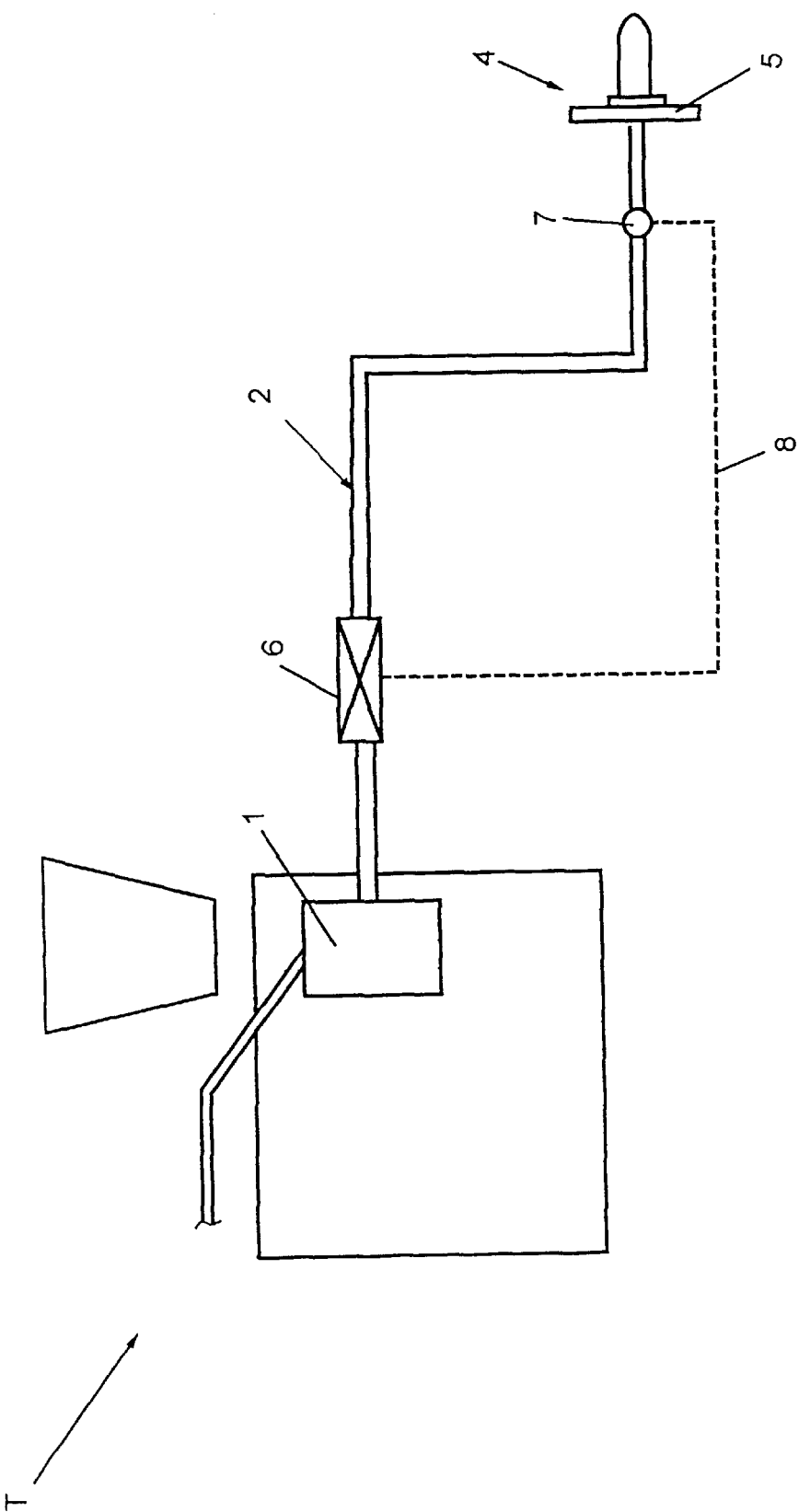

According to FIG. 1, liquid food is prepared in a mixing tank 1, the said mixing tank 1 possibly being a constituent part of a generally known automatic drinker T which is not described in detail here. Reference is made here to DE-A 34 01 168 only by way of example.

The liquid food mixture prepared passes from the mixing tank 1 into a suction line 2 which leads to a teat at a suckling point 4 for the domestic animal. In the present case, the teat 3 is arranged on a fixture 5, the said fixture 5 possibly also being part of a shed wall.

A valve 6 is connected into the suction line between the mixing tank 1 and the suckling point 4. Together with a pressure sensor 7, the said valve 6 prevents the liquid emerging from the suckling point 4 in the case of no domestic animal being provided with food.

When a domestic animal wishes to remove food and begins to suckle at the suckling point 4 this is picked up by the pressure sensor 7 which is connected to the valve 6 by a line 8 (indicated only by dashes). The pressure sensor 7 may also, for example, be a pressure sensor (diaphragm sensor) which transmits a switching pulse to the valve 6 owing to the suckling. The valve 6 opens at least as long as the domestic animal is suckling.

It can seen that the mixing tank 1 and, in the present exemplary embodiment, the entire automatic drinker T are disposed at a higher level than the suckling point 4. This means that the food in the suction line 2 is under static pressure so that it flows unimpeded from the mixing tank 1 to the suckling point 4 provided that the valve 6 is open. This facilitates the provision of liquid food to the domestic animal.

Figure 2:
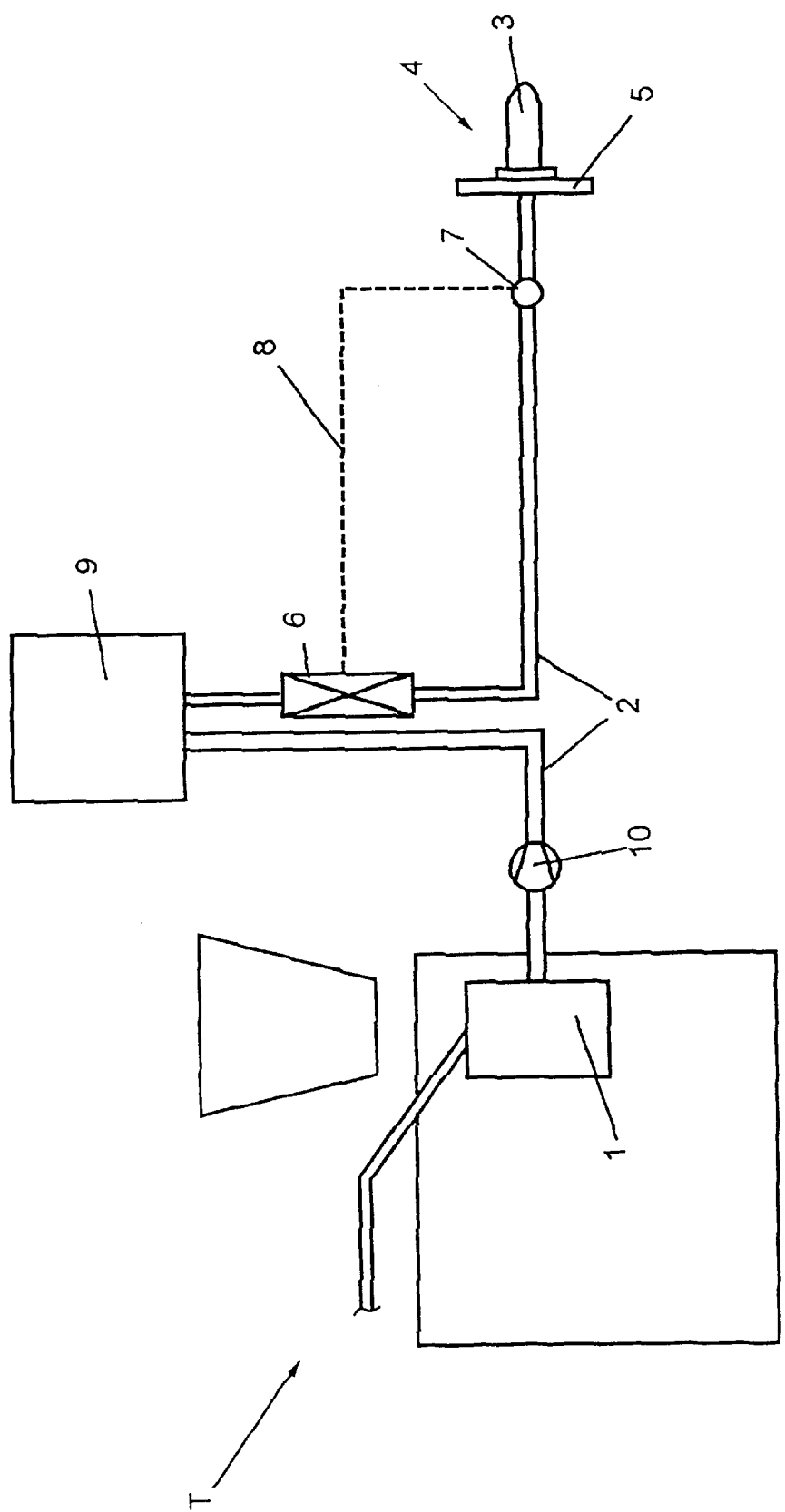
FIG. 2 shows a diagrammatic illustration of a further exemplary embodiment of an apparatus according to the invention for providing domestic animals with liquid food.

Another possibility of supplying liquid food under static pressure is indicated in FIG. 2. In this case, a separate storage tank 9 and a pump 10 are provided in the suction line 2 between the mixing tank 1 and the valve 6. The storage tank 9 is suspended at a higher level than the automatic drinker T and, in particular, the suckling point 4, so that the liquid between the storage tank 9 and the suckling point 4 is under static pressure, as mentioned above.

The storage tank 9 is filled by means of the pump 10 which transports the liquid food mixture from the mixing tank 1 into the storage tank 9. After the valve 6 has been opened as a result of the switching pulse of the pressure sensor 7, the food passes from the storage tank 9 to the suckling point 4. The present inventive concept shall also include the fact that a plurality of suckling points 4 may be connected to a storage tank 9 and/or to the mixing tank 1 in the manner described above.

Figure 3:
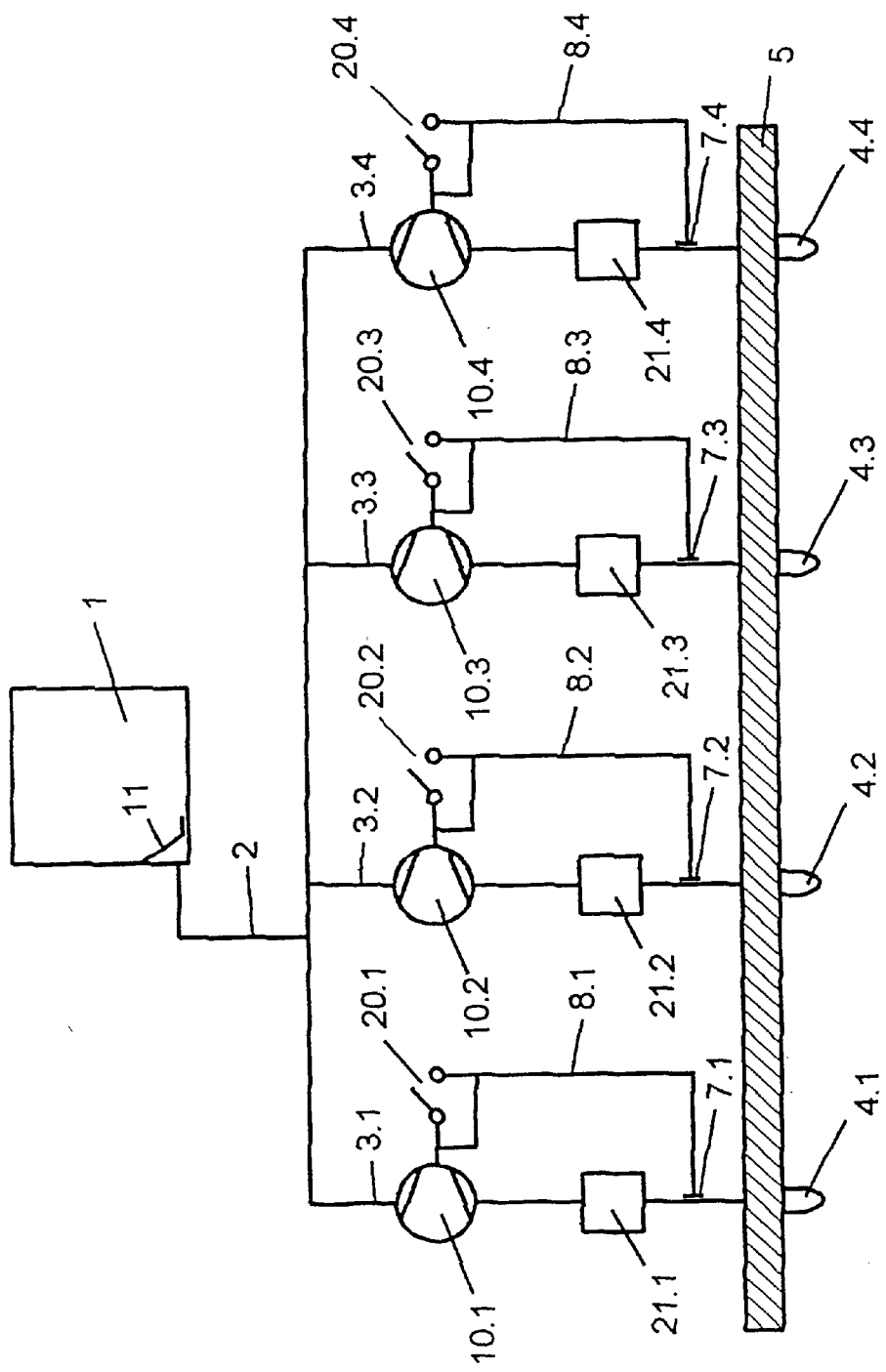
FIG. 3 shows a diagrammatic illustration or block circuit diagram of an apparatus according to the invention for providing animals with liquid food.

In a further exemplary embodiment of the invention shown in FIG. 3, the liquid food mixture prepared passes from the mixing tank 1 into a main line 2 which supplies a plurality of branch lines 3.1–3.4. Each branch line 3.1–3.4 leads to a teat 4.1–4.4 which forms a suckling point for the domestic animal. In the present case, all the teats 4.1–4.4 are arranged on a common fixture 5.

Provided in each branch line 3.1–3.4 is a feed pump 10.1–10.4 by means of which the liquid food can be delivered to the teat 4.1–4.4. The objects and advantages of this feed pump 10.1–10.4 are described in DE-A 36 13 887. It is also mentioned there that the activity of the feed pump 10.1–10.4 is controlled by means of a pressure sensor 7.1–7.4 which determines whether an overpressure and/or pressure occurs in the branch line 3.1–3.4 between the feed pump 10.1–10.4 and the teat 4.1–4.4. Such a pressure occurs whenever a domestic animal begins to suckle so that the feed pump 10.1–10.4 is then switched on and assists the consumption of food by the domestic animal.

According to the invention, a switch 20.1–20.4 is connected into a line 8.1–8.4 between the pressure sensor 7.1–7.4 and the feed pump 10.1–10.4, by means of which switch the feed pump 10.1–10.4 can also be started up separately from the pressure sensor 7.1–7.4, so that a small amount of liquid food can emerge from the teat 4.1–4.4 to encourage the domestic animal to be fed.

Furthermore, according to the invention, in the present exemplary embodiment, a volume measuring element 21.1–21.4 is connected in between the feed pump 10.1–10.4 and the teat 4.1–4.4, by means of which volume measuring element the quantity of liquid food removed at the respective suckling point or teat 4.1–4.4 is determined precisely. Such volume measuring elements 21.1–21.4 for a free-flowing medium are generally commercially available, it being possible for any of these throughflow measuring devices to be used. Furthermore, it is possible to arrange the volume measuring element 21.1–21.4 separately between the feed pump 10.1–10.4 and the teat 4.1–4.4. However, it would be more favorable to assign the volume measuring element directly to the feed pump 10.1–10.4 or to choose a pump with which the quantity delivered is measured directly.

A screen 11 is preferably assigned to an outlet to the main line 2 in the mixing tank 1, which screen is also described in the Utility Model Application 296 03 702.8 to which reference is made here. The purpose of the said screen is, on the one hand, to retain undissolved lumps of powder but, on the other hand, the grid or screen prevents air bubbles, which arise during the mixing operation in the mixing tank, from passing into the main line 2. The accuracy of the volume measurement would deteriorate substantially due to such air bubbles.

Provision is also made for the screen 11 to be cleaned by a stirrer in the mixing tank 1 or by bristles attached to a stirrer.

Figure 4:
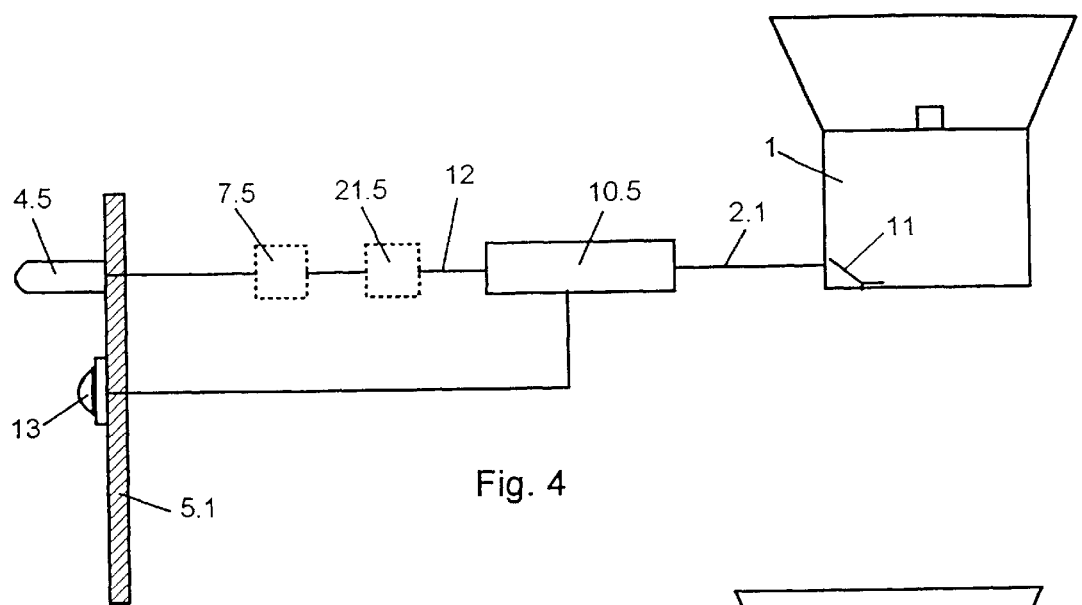
FIG. 4 shows a diagrammatic illustration or block circuit diagram of a further exemplary embodiment of an apparatus for providing domestic animals with liquid food.

In a further exemplary embodiment of the present invention according to FIG. 4, a feed pump 10.5 is connected downstream of the mixing tank 1 in a main line 2.1, which feed pump is connected to a teat 4.5 via a feedline 12. The teat 4.5 is fastened to a fixture 5.1. A switch 13 by means of which the feed pump 10.5 can be started up is preferably located near to the teat 4.5. By actuating the switch 13, the food can be delivered from the mixing tank 1, by start up of the pump 10.5, to the teat 4.5.

The main advantage resulting from this arrangement is that, using centrifugal or spiral pumps as feed pumps 10.5 which allow the food to flow through the feed pump 10.5 without resistance while it is stationary, the calf can suck up the food at the teat 4.5 at any time.

Consequently, in this exemplary embodiment, the feed pump 10.5 mainly serves only to deliver the food from the tank 1 forward to the teat 4.5. The food is thus already located in the teat 4.5 even without any sucking, and the calf can consume the food immediately. This is desirable when the calf is still very small and has to be accustomed to suckling at such devices.

Moreover, cleaning the main line 2.1, the line 12 and the teat 4.5 can take place by means of the pump 10.5 which may also be mounted on the mixing tank 1. For this purpose, the mixing tank 1 is filled with water and/or a cleaning agent which is pumped through the lines 2.1 and 12.

In this exemplary embodiment, provision is also to be made for a volume measuring element 21.5 and/or pressure sensor 7.5 to be interposed between the teat 4.5 and the feed pump 10.5 in order to switch the pump 10.5 on and to determine the quantity of food precisely. However, these may also be arranged between the feed pump 10.5 and the mixing tank 1.

When the calf has been accustomed to suckling using the teat 4.5, the upstream pumping of the food can be dispensed with. The calf can then suck the food directly out of the tank 1, the said food flowing through the feed pump 10.5 without resistance. The quantity of food can then be controlled by the volume measuring element 21.5.

Figure 5:
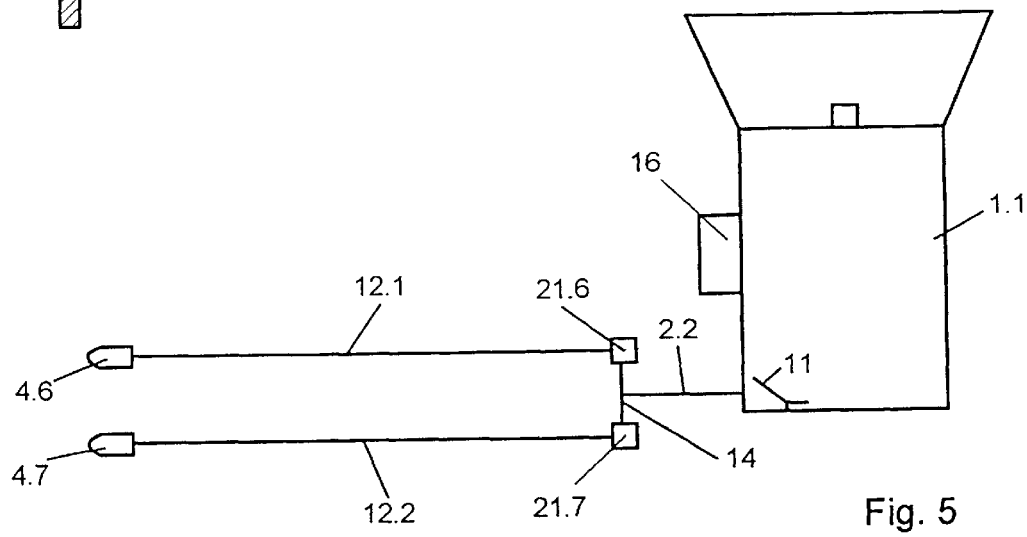
FIG. 5 shows a diagrammatic illustration or block circuit diagram of a possible arrangement for controlling an apparatus for providing domestic animals with food according to FIG. 1.

In a further exemplary embodiment of the present invention according to FIG. 5, at least two separate volume measuring devices 21.6, 21.7 are connected to a mixing tank 1.1 via a T-piece 14. The said devices essentially comprise a magnetic switch with an integrated pressure valve. The magnetic switch can actuate the respective feedlines 12.1, 12.2 to the teats 4.6, 4.7 separately via a corresponding control. A calf can drink at each teat 4.6, 4.7. In this case, detection devices for transponders are assigned to the teats 4.6 and 4.7 to detect which calf is drinking at which teat.

The quantity drunk by a calf can be determined, for example, via the opening time of the solenoid valve. This has the advantage of dispensing with complicated volume measuring devices which operate with a flow meter or similar elements. A simple solenoid valve is sufficient here. The pressure sensor serves only to activate and open the solenoid valve when the calf wishes to drink at one of the teats 4.6, 4.7. Solenoid valves of this type are also easy to control and clean.

If, for example, a plurality of volume measuring devices 21.1, 21.2 are connected to a single mixing tank 1.1, it is not possible to determine the precise quantity each calf drinks, since the quantity is only determined via the opening time of the valves. However, when drinking, calves show different suckling and drinking behavior. For example, one calf sucks more forcefully than another. Consequently, one calf can drink more than the other in the same time.

Thought should also be given here to connecting to the mixing tank 1.1 a plurality of feedlines 12.1, 12.2 to the suckling points 4 directly with a plurality of volume measuring devices 21.1, 21.2. The line 2.2 can then be dispensed with. The volume measuring devices 21.1, 21.2 are preferably configured as solenoid valves whose opening time can be controlled.

In order to take account of this behavior, each calf is assigned a specific factor. The said factor is stored in a control unit 16 of the mixing tank 1.1. It can be determined and entered individually for each calf.

This factor is determined automatically when the calf drinks, for example alone, at the suckling point. A specific quantity of food is supplied to a calf via the volume measuring device, the opening time in which the calf can drink this quantity of food being measured. Consequently, each calf receives its own factor which is incorporated into the control of the opening times of the volume measuring devices 15.1, 15.2 automatically and individually for each calf. Only when a calf drinks from the device by itself is this factor newly determined after each drinking period, and it is incorporated as a correction factor for the next joint suckling episodes with other calves. By means of this factor, a correction of the quantity drunk can be carried out if calves consume different amounts of food during the same opening time.

In the exemplary embodiment shown, a simple T-piece 14 is provided in order to bifurcate the suction line 2.2. It is also conceivable here to connect a plurality of T-pieces 14 to the suction line 2.2 in order to provide food to a plurality of teats.

Figure 6:
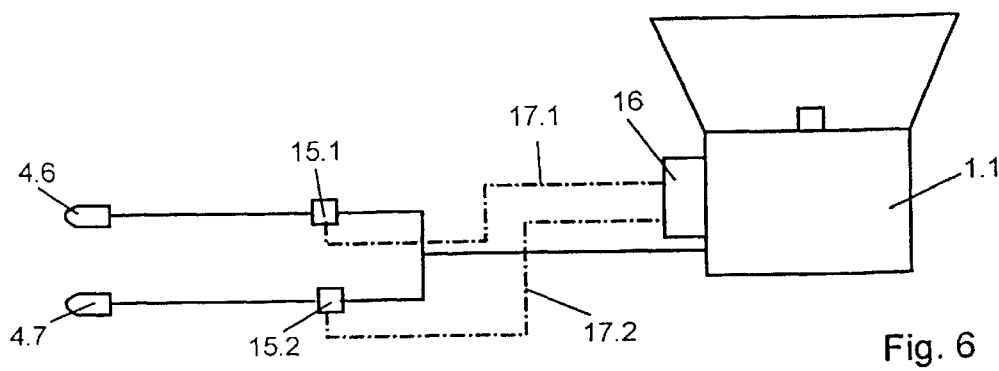
FIG. 6 shows a further diagrammatic illustration or block circuit diagram of a further exemplary embodiment of an apparatus according to FIG. 3.

As illustrated diagrammatically in FIG. 6, the volume measuring devices 15.1, 15.2 can also be actuated directly by a control unit 16 on the mixing tank 1.1 via signal lines 17.1, 17.2 (indicated by dashes).

Figure 7:
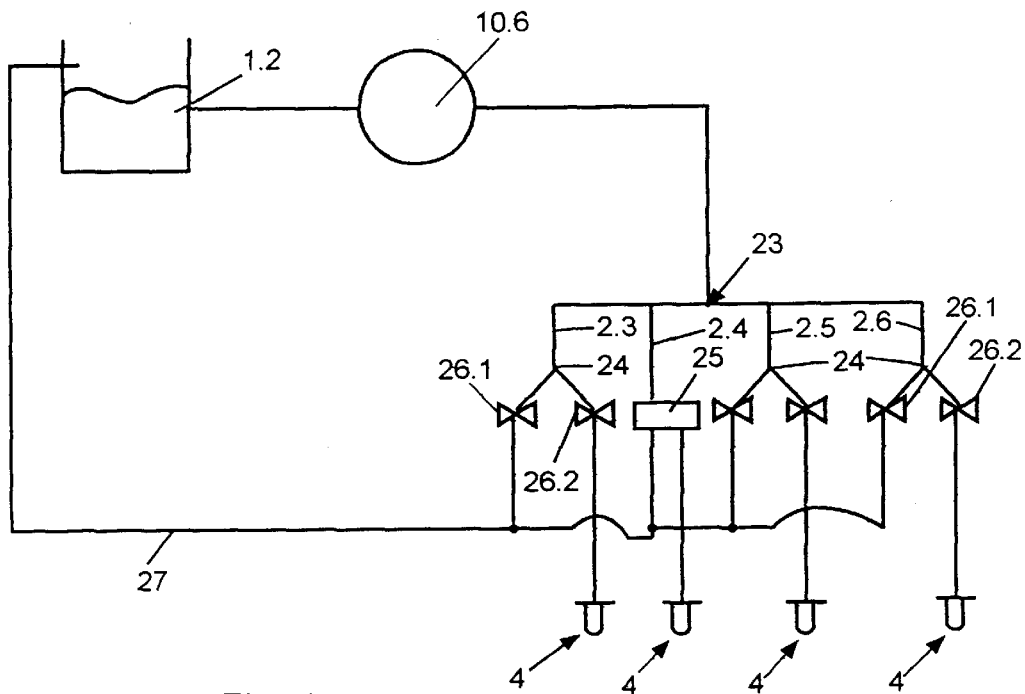
FIG. 7 shows a diagrammatic illustration or block circuit diagram of a further exemplary embodiment of an apparatus for providing domestic animals with liquid food.

In a further exemplary embodiment of the present invention according to FIG. 7, a pump 10.6 is connected to a mixing tank 1.2 via a connection line 22, which pump leads to a distributor 23. From there, individual suction lines 2.3 to 2.6 branch off, a bifurcation 24 or a switchover valve 25 being seated in each case at the ends thereof.

Solenoid valves 26.1 and 26.2 are connected in each case to the bifurcation 24. The solenoid valve 26.2 leads directly to the suckling point 4. In contrast, the solenoid valve 26.1 leads to a common return line 27 which is connected to the mixing tank 1.2. The switchover valve 25 is likewise connected on the one hand to the suckling point 4 and, on the other hand, also to the return line 27. The advantage thus resulting is that the constant pressure which is constant at all the suckling points 4 remains intact, in which case it is irrelevant how many suckling points are being operated. The liquid food is constantly either transported via the return line 27 into the mixing tank 1.2 or fed to the calf via the suckling point 4, depending on the switching of the solenoid valves 26.1, 26.2.

Pressure compensation takes place due to the constant transporting of the food into the mixing tank 1.2. In this case centrifugal or spiral pumps are preferably used as pumps 10.6. A constant pressure prevails in the entire line system, so that a precise quantity drunk by the calf at the suckling points can be determined. The solenoid valves 26.1, 26.2 switch optionally. If the solenoid valve 26.2 is opened by the suckling at the suckling point 4, the solenoid valve 26.1 is closed at the same time. When the suckling ceases, the solenoid valve 26.2 is closed and the other solenoid valve 26.1 is opened. The switchover valve 25 can also take over the same function.

Figure 8:
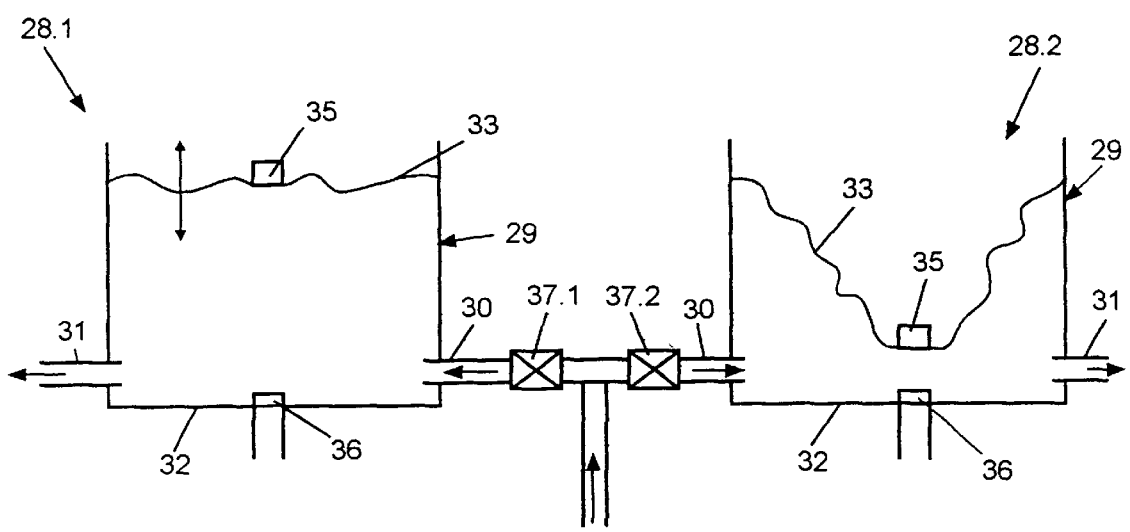
FIG. 8 shows a diagrammatically illustrated cross section of a buffer for storing food.

In a further exemplary embodiment of the present invention, according to FIG. 8 a buffer 28.1 is shown, which can preferably be interposed between the solenoid valves and suckling points 4 in the devices described above. Two buffers 28.1, 28.2 are preferably arranged adjacently and connected to one another via the inlets 30 with interposed valves 37.1, 37.2. These are supplied with food via a T-piece. In this case, food is supplied to one buffer or the other 28.1, 28.2. The food may be supplied in alternation. The food thus passes into a closed tank 29, the volume of which is variable. In this case, a wide variety of designs of such tanks 29 are conceivable.

When the tank 29 is full, the supply of food is interrupted and the calf drinks from this tank 29, in which case, for example, a diaphragm 33 deflects until the tank 29 has been emptied through an outlet 31. The said diaphragm 33 is provided with a sensor 35 or magnets or a similar piece of metal which triggers a signal to a switch 36 when the diaphragm 33 comes to rest near to the tank bottom 32. While all the contents of the tank 29 are being drunk, a further tank 29 can be filled.

When the first tank 29 is empty, the sensor 35 transmits a signal, for example by means of the diaphragm 33, in order to operate the suckling point 4 again, if appropriate via the buffer 28.1. However, it is also important for the opening times of the valves 37.1, 37.2 to be able to remain open for a certain subsequent period with the switch 36 switched off in order to fill or utilize the tank 29 of the buffer 28.1, 28.2 in an optimum manner. Consequently, wear of the solenoid valves is reduced with a simultaneous reduction in their switching frequency.

Figure 9:
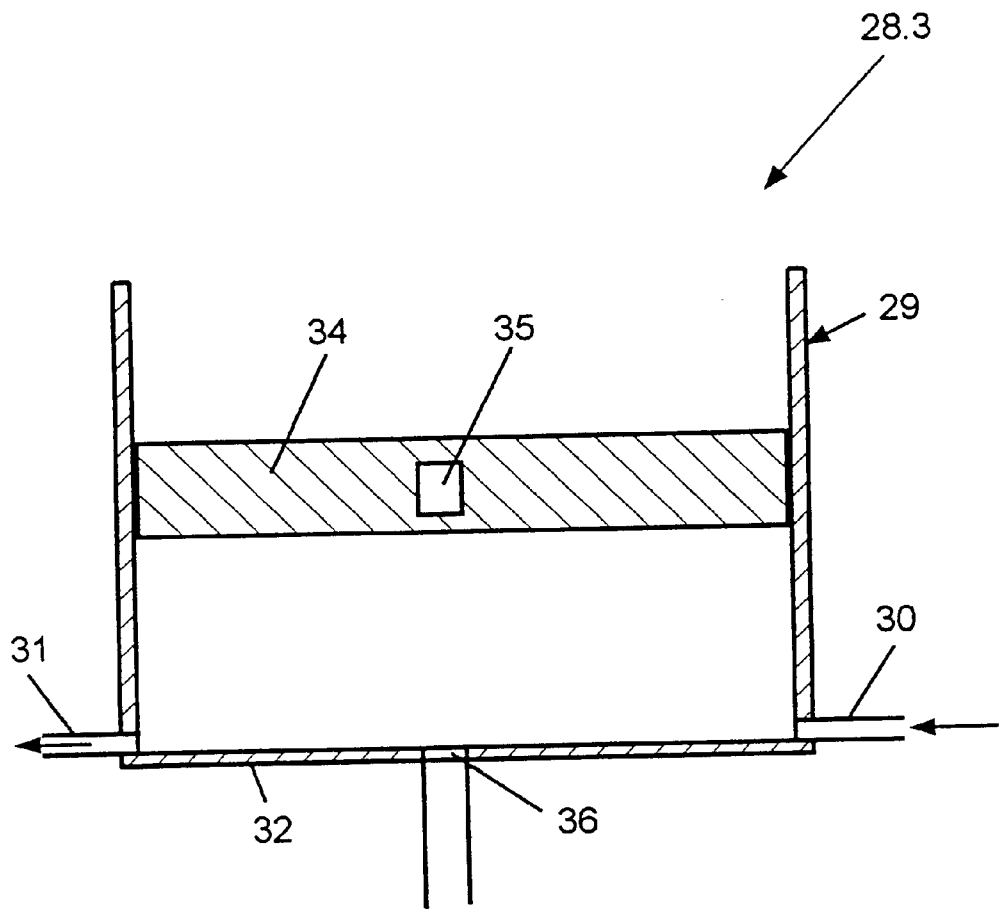
FIG. 9 shows a diagrammatically illustrated cross section of a further buffer according to FIG. 8.

In a further embodiment of the present invention according to FIG. 9, a piston 34 is inserted into a tank 29 instead of the diaphragm 33, which piston moves upward when the tank 29 is filled. After filling, the feedline or the inlet 30 is interrupted by means of the valve 37, and the calf can drink all the contents of the tank 29. During this time, a further tank can be filled up. The first tank can be completely emptied by a calf. While it is drinking, the piston moves slowly downward in the direction of the tank bottom 32. A corresponding signal is then transmitted via the sensor 35 and the switch 36 is switched in order to fill the tank 29 again. During this time, the feedline or the inlet 30 is then closed, and the other tank can then be filled.

As a result, a constant pressure is also maintained within the system, and a quite specific, measurable residual quantity of food is provided to the calf for drinking. A further advantage is that a tank of this type can be cleaned very easily, since it is sealed off from the environment. It only needs to be rinsed through. The design of the piston of the buffer 28.3 also permits many advantages, since it can also be cleaned very easily in its retracted position.

What is claimed is:

1. Method of providing a domestic animal with liquid food, which comprises: providing liquid food for domestic animals in a storage tank of an automatic drinker system; passing liquid food from said storage tank to a suckling point for said domestic animal via a suction line; connecting a pressure sensor to said suction line upstream of the suckling point, connecting at least one feed pump to said suction line; measuring the quantity of liquid food removed from said suckling point by said domestic animal upstream of the suckling point; and including at least one of the following: (1) connecting the feed pump to a switch operative to activate the feed pump, and (2) switching the feed pump to throughflow in the event of a stoppage in the flow of liquid food to the suckling point, and including providing a connection of the suction line between the suckling point and the storage tank which is open for suckling with virtually no resistance to the flow of liquid food.

2. Method according to claim 1, wherein the quantity of liquid food removed from said suckling point by said domestic animal is measured by means of said at least one feed pump connected to the suction line.

3. Method according to claim 1, including the step of connecting at least one valve to the suction line operative to permit and prevent liquid food flow through the suction line, and determining suckling times of domestic animals in relation to the opening time of said valve.

4. Method according to claim 1, including the step of connecting at least one valve to the suction line operative to permit and prevent liquid food flow through the suction line, and wherein an individual suckling speed for each animal is determined by means of the valve opening time, and is compensated for by means of variations in the opening time.

5. Method according to claim 1, including the step of providing individual measuring elements between the storage tank and suckling point.

6. Method according to claim 1, including the step of compensating for pressure fluctuations in the system by maintaining a constant upstream pressure on the suction line.

7. Method according to claim 1, including the step of compensating for pressure fluctuations in the system by at least one pressure controller in the suction line.

8. Method according to claim 1, including the step of compensating for pressure fluctuations in the system by at least one volume controller in the suction line.

9. Method according to claim 1, including the step of connecting at least one valve to the suction line operative to permit and prevent liquid food flow through the suction line, and determining the quantity of food delivered to an animal by at least one of (1) a negative suction pressure in the system, and (2) a pressure drop with said valve being open.

10. Method according to claim 1, including providing return lines to the storage tank and maintaining a constant pressure at a plurality of suckling points by closing return lines.

11. Method according to claim 10, including providing said feed pump between the storage tank and suckling points and maintaining a constant pump pressure by alternately switching back and forth between the suckling points and return lines.

12. Method according to claim 1, wherein said storage tank is a mixing tank.

13. Method according to claim 12, including maintaining a separate storage tank downstream of said mixing tank.

14. Method according to claim 1, including a plurality of said suckling points.

15. Method according to claim 1, including the step of connecting at least one valve to the suction line downstream of the storage tank.

16. Method according to claim 1, including locating the switch adjacent the suckling point.

17. Apparatus for providing a domestic animal with liquid food, which comprises: a storage tank of an automatic drinker system for liquid food for a domestic animal; a suction line from said storage tank to a suckling point for passing liquid food from said storage tank to said suckling point; a pressure sensor connected to said suction line upstream of the suckling point; at least one feed pump connected to said suction line; and a volume measuring element upstream of said suckling point to measure the quantity of liquid food removed from said suckling point by said domestic animal, wherein the apparatus includes at least one of the following: (1) wherein the feed pump is connected to a switch operative to activate the feed pump and (2) wherein the feed pump switches to throughflow in the event of a stoppage in the flow of liquid food to the suckling point, and including a connection of the suction line between the suckling point and the storage tank which is open for suckling with virtually no resistance to the flow of liquid food.

18. Apparatus according to claim 17, including a plurality of said suckling points.

19. Apparatus according to claim 17, wherein said storage tank is a mixing tank.

20. Apparatus according to claim 19, including a further storage tank between the mixing tank and suckling point.

21. Apparatus according to claim 20, wherein said feed pump is connected between the mixing tank and further storage tank, which feed pump also serves to determine the quantity of food delivered to the storage tank.

22. Apparatus according to claim 17, wherein the liquid food in the suction line to the suckling point is under static pressure.

23. Apparatus according to claim 22, including a plurality of said suction lines connected to said storage tank.

24. Apparatus according to claim 23, wherein said storage tank is maintained at a higher level than the suckling point.

25. Apparatus according to claim 17, including at least one valve connected to the suction line downstream of the storage tank.

26. Apparatus according to claim 25, wherein said valve is a solenoid valve.

27. Apparatus according to claim 17, wherein the switch is located adjacent the suckling point.

* * * * *